United States Patent
Okano et al.

(10) Patent No.: US 10,396,347 B2
(45) Date of Patent: Aug. 27, 2019

(54) POSITIVE ELECTRODE FOR AIR BATTERY, AIR BATTERY USING THE POSITIVE ELECTRODE, AND METHOD OF MANUFACTURING THE POSITIVE ELECTRODE

(71) Applicants: NATIONAL INSTITUTE OF TECHNOLOGY, Tokyo (JP); TOYO TANSO CO., LTD., Osaka-shi, Osaka (JP)

(72) Inventors: Hiroshi Okano, Takamatsu (JP); Tomofumi Kurosaki, Kurashiki (JP); Takurou Tsuruoka, Sakaide (JP); Toshihiro Hosokawa, Mitoyo (JP); Nobuya Misaki, Mitoyo (JP); Tetsuya Yuki, Mitoyo (JP)

(73) Assignees: NATIONAL INSTITUTE OF TECHNOLOGY, Hachioji-shi (JP); TOYO TANSO CO., LTD., Osaka-shi (JP)

( * ) Notice: Subject to any disclaimer, the term of this patent is extended or adjusted under 35 U.S.C. 154(b) by 196 days.

(21) Appl. No.: 15/527,115

(22) PCT Filed: Dec. 4, 2015

(86) PCT No.: PCT/JP2015/084200
§ 371 (c)(1),
(2) Date: May 16, 2017

(87) PCT Pub. No.: WO2016/088891
PCT Pub. Date: Jun. 9, 2016

(65) Prior Publication Data
US 2018/0019461 A1  Jan. 18, 2018

(30) Foreign Application Priority Data
Dec. 4, 2014  (JP) ................ 2014-245576

(51) Int. Cl.
| | | |
|---|---|---|
| H01M 4/133 | (2010.01) |
| H01M 4/1393 | (2010.01) |
| H01M 4/86 | (2006.01) |
| H01M 4/88 | (2006.01) |
| H01M 4/02 | (2006.01) |
| H01M 4/90 | (2006.01) |
| H01M 4/96 | (2006.01) |
| H01M 12/06 | (2006.01) |
| H01M 12/08 | (2006.01) |

(52) U.S. Cl.
CPC ......... *H01M 4/133* (2013.01); *H01M 4/1393* (2013.01); *H01M 4/86* (2013.01); *H01M 4/8647* (2013.01); *H01M 4/88* (2013.01); *H01M 4/8875* (2013.01); *H01M 4/90* (2013.01); *H01M 4/96* (2013.01); *H01M 12/06* (2013.01); *H01M 12/08* (2013.01); H01M 2004/028 (2013.01); H01M 2004/8689 (2013.01); Y02E 60/128 (2013.01)

(58) Field of Classification Search
CPC .. H01M 4/133; H01M 4/1393; H01M 4/8647; H01M 4/8875; H01M 4/86; H01M 4/96; H01M 12/08; H01M 12/06; H01M 4/88; H01M 4/90; H01M 2004/8689; H01M 2004/028; Y02E 60/128
See application file for complete search history.

(56) References Cited

U.S. PATENT DOCUMENTS

| | | | |
|---|---|---|---|
| 2011/0269056 A1 | 11/2011 | Mizuno | |
| 2013/0101907 A1 | 4/2013 | Takahashi et al. | |
| 2014/0178775 A1* | 6/2014 | Lee | H01M 12/08 429/405 |
| 2015/0104720 A1* | 4/2015 | Ma | H01M 12/08 429/405 |
| 2015/0229012 A1 | 8/2015 | Toyoda et al. | |
| 2016/0301086 A1 | 10/2016 | Okano et al. | |

FOREIGN PATENT DOCUMENTS

| | | |
|---|---|---|
| JP | 38-15709 B1 | 8/1963 |
| JP | 61-32358 A | 2/1986 |
| JP | 10-189006 A | 7/1998 |
| WO | 2010/084614 A1 | 7/2010 |
| WO | 2012/001745 A1 | 1/2012 |
| WO | 2014/038692 A1 | 3/2014 |
| WO | 2015/076402 A1 | 5/2015 |

OTHER PUBLICATIONS

Zhang, X. et al., "Catalytically active single-atom niobium in graphitic layers", Nature Communications, May 28, 2013, vol. 4, pp. 1-7.
Extended (supplementery) European Search Report dated Apr. 13, 2018, issued in counterpart European Application No. 15866112.4. (7 pages).
International Search Report dated Mar. 8, 2016, issued in counterpart of International Application No. PCT/JP2015/084200 (2 pages).

* cited by examiner

*Primary Examiner* — Muhammad S Siddiquee
(74) *Attorney, Agent, or Firm* — Westerman, Hattori, Daniels & Adrian, LLP

(57) ABSTRACT

A positive electrode for an air battery that can remarkably improve the battery performance is provided by uniformly dispersing fine Nb (Nb oxide) therein. An air battery using the positive electrode as well as a method of manufacturing the positive electrode is also provided.

A positive electrode for an air battery includes an expanded graphite sheet containing expanded graphite and Nb dispersed within the sheet. It is desirable that the Nb be contained in a weight proportion of from 5 ppm to 50000 ppm with respect to the expanded graphite.

13 Claims, 2 Drawing Sheets

POSITIVE ELECTRODE FOR AIR BATTERY, AIR BATTERY USING THE POSITIVE ELECTRODE, AND METHOD OF MANUFACTURING THE POSITIVE ELECTRODE

TECHNICAL FIELD

The present invention relates to a positive electrode for an air battery, an air battery using the positive electrode, and a method of manufacturing the positive electrode.

BACKGROUND ART

Air batteries are capable of containing a higher proportion of the negative electrode active material in the battery case, in comparison with such as lithium secondary batteries. Accordingly, the air batteries are capable of obtaining a higher discharge capacity, which means that size reduction and weight reduction of the batteries are easier. Moreover, the air batteries have a low environmental impact because they use oxygen as the positive electrode active material, which is free from constraints on resource availability and also is a clean material. For these reasons, it is expected that the air batteries will be widely used for such as batteries for electric vehicles, batteries for hybrid vehicles, and batteries for fuel cell vehicles.

Here, it is required that the positive electrode for the air battery have electrical conductivity, chemical stability, and capability of supplying oxygen-originating hydroxide ions. In view of this, a positive electrode for an air battery that has a catalyst layer formed by adding activated carbon and a catalyst to Teflon (registered trademark) powder (Patent Literature 1) and a positive electrode for an air battery that uses a carbon material that permeates gas but does not permeate liquid (Patent Literature 2) have been disclosed.

In the conventional positive electrode for an air battery as described in Patent Literature 1 above, the carbonaceous component existing on the surface has a small surface area, so the supply of hydroxide ions is inhibited by the components other than the carbonaceous component. In addition, the conventional positive electrodes for an air battery as disclosed in Patent Literatures 1 and 2 need to have communicating pores for passing oxygen gas along a thickness direction of the positive electrode, in order to supply oxygen that is necessary for supplying hydroxide ions. However, the communicating pores cause a greater amount of the electrolyte solution to evaporate therethrough, and consequently, the amount of the electrolyte solution decreases. This results in the problems such as the deterioration in battery output power. Another problem has been that, because the HOPG used in Patent Literature 2 above is a costly material, the manufacturing cost of the battery increases.

In order to solve the foregoing problems, an expanded graphite sheet is expected to be used as the positive electrode for an air battery.

CITATION LIST

Patent Literature

[Patent Literature 1] Japanese Published Unexamined Patent Application No. H10-189006
[Patent Literature 2] WO 2010/084614

SUMMARY OF INVENTION

Technical Problem

However, when an ordinary expanded graphite sheet is used as the positive electrode for an air battery, a problem arises that the voltage decrease during discharge is significant.

In view of the problem, it is an object of the present invention to provide a positive electrode for an air battery that can remarkably improve battery performance by dispersing fine Nb within the expanded graphite sheet, as well as an air battery using the positive electrode and a method of manufacturing the positive electrode.

Solution to Problem

In order to accomplish the foregoing object, the present invention provides a positive electrode for an air battery that includes an expanded graphite sheet containing expanded graphite and Nb dispersed within the sheet.

Advantageous Effects of Invention

The present invention achieves a significant advantageous effect of remarkably improving the battery performance (i.e., discharge characteristics) by dispersing fine Nb within the sheet.

DESCRIPTION OF EMBODIMENTS

Figure 1:
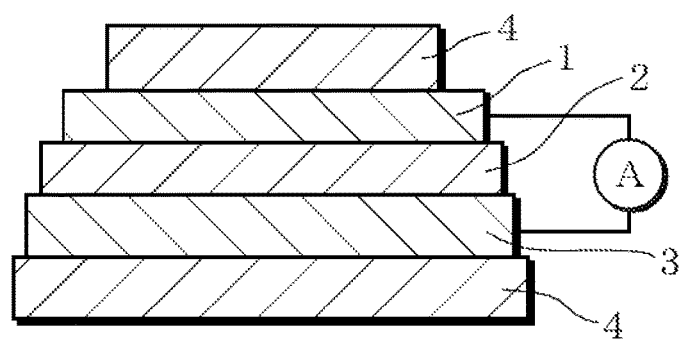
FIG. 1 is an illustrative view of a battery using an expanded graphite sheet of the present invention.

A positive electrode for an air battery according to the present invention is characterized by comprising an expanded graphite sheet containing expanded graphite and Nb dispersed within the sheet.

When Nb is dispersed in the expanded graphite sheet, the battery performance (i.e., discharge characteristics) is remarkably improved.

The positive electrode for an air battery may also contain sulfur, manganese, or the like, in addition to the expanded graphite and Nb.

It is preferable that the Nb be contained in the sheet in the form of a Nb oxide.

This enhances affinity of Nb with oxygen and consequently improves the battery performance.

It is preferable that the Nb be dispersed within the sheet using a Nb-containing sol solution.

When the Nb is dispersed within the sheet using a Nb-containing sol solution, the Nb (Nb oxide) can be dispersed uniformly on the order of nanometers in the expanded graphite sheet. This remarkably improves the battery performance (i.e., discharge characteristics).

It may appear possible to employ a method in which Nb (Nb oxide) is added to a graphite sheet before or after expanding of the graphite sheet and mixed with the use of a mill or the like, and thereafter the resultant material is pressed to form a shape (i.e., a solid phase method). With this method, however, it may be difficult to disperse the Nb (Nb oxide) uniformly within the sheet, and moreover, it may be difficult to obtain fine (e.g., 1 μm or less) Nb (Nb oxide) powder.

It is desirable that the Nb be contained in a weight proportion of from 5 ppm to 50000 ppm, more desirably from 50 ppm to 5000 ppm, with respect to the expanded graphite.

If the proportion is less than 5 ppm, the effect obtained by adding the Nb may not be exhibited sufficiently. On the other hand, if the proportion exceeds 50000 ppm, the characteristics as the expanded graphite sheet may be degraded.

It is desirable that the above-described expanded graphite sheet have a bulk density of from 0.2 $Mg/m^3$ to 2.0 $Mg/m^3$.

When the bulk density of the expanded graphite sheet is less than 0.2 $Mg/m^3$, the shape of the sheet may be more likely to break down easily. On the other hand, if the bulk density of the expanded graphite sheet exceeds 2.0 $Mg/m^3$, the volume of the microgaps between the expanded graphite particles may be too small, so the amount of the ambient air passing therethrough may be insufficient, and moreover, the surface area that comes into contact with the electrolyte solution may also become small. As a consequence, the battery performance may deteriorate. Taking these matters into consideration, it is more desirable that the expanded graphite sheet have a bulk density of from 0.3 $Mg/m^3$ to 1.5 $Mg/m^3$, still more desirably from 0.3 $Mg/m^3$ to 0.75 $Mg/m^3$.

It is desirable that the above-described expanded graphite sheet have a thickness of from 0.1 mm to 3.0 mm.

If the thickness of the expanded graphite sheet is less than 0.1 mm, the amount of the air contained therein may be too small, so the amount of oxygen supplied may be insufficient, and moreover, the surface area thereof that comes into contact with the electrolyte solution may also become too small. On the other hand, if the thickness of the expanded graphite sheet exceeds 3.0 mm, the proportion of the positive electrode in the battery may be too high, so the battery may not be able to have a high capacity. From the viewpoint of obtaining a higher capacity of the battery, it is particularly desirable that the expanded graphite sheet have a thickness of 0.80 mm or less.

The present invention also provides an air battery including a positive electrode, a negative electrode, and an electrolyte solution, in which the positive electrode is characterized by comprising an expanded graphite sheet containing expanded graphite and Nb dispersed within the sheet.

It is desirable that the Nb be dispersed within the sheet using a Nb-containing sol solution.

Thereby, the Nb (Nb oxide) can be dispersed uniformly on the order of nanometers in the expanded graphite sheet, as described above.

In addition, it is desirable that the expanded graphite sheet include a surface that is shielded from ambient air and is opposite a surface thereof being in contact with the electrolyte solution.

Because the other side of the expanded graphite sheet that is opposite the one side being in contact with the electrolyte solution is shielded from ambient air, the gas permeation in a thickness direction is prevented, and as a result, the evaporation of the electrolyte solution is inhibited more effectively.

The invention is also characterized by a method of manufacturing a positive electrode for an air battery, comprising: a step of obtaining $Nb(COH_3)_5$ by mixing niobium chloride ($NbCl_5$) and methyl alcohol ($CH_3OH$); a step of obtaining a Nb-containing sol solution represented by the formula $[Nb(OH)_5]_n$ by hydrolyzing the $Nb(COH_3)_5$; a step of preparing a mixture by adding the Nb-containing sol solution to an acid treated graphite and mixing the Nb-containing sol solution and the acid treated graphite; a step of forming expanded graphite by an expansion process in which the mixture is heated; and a step of preparing an expanded graphite sheet by pressing the expanded graphite and thereafter heat-treating the expanded graphite.

EXAMPLES

Example

As illustrated in FIG. 1, the air battery of the present invention has the following structure. An aluminum foil 1 (thickness: 0.1 mm) as the negative electrode, a paper wipe 2 (tradename: Kimwipe, made by Nippon Paper Crecia Co., Ltd.) impregnated with a salt solution (0.1 mol/L) as the electrolyte solution, and a Nb-containing expanded graphite sheet 3 as the positive electrode are stacked successively to form a laminated material. The laminated material is interposed between two acrylic resin plates 4 each having a thickness of 1 mm. Note that the peripheral end face of the expanded graphite sheet 3 as the positive electrode is exposed to the ambient air.

Herein, the just-mentioned Nb-containing expanded graphite sheet as the positive electrode was prepared in the following manner.

(Preparation of Acid-treated Graphite)

First, an acid treatment solution was prepared by adding 5 parts by weight of hydrogen peroxide as an oxidizing agent to 100 parts by weight of strong sulfuric acid with a concentration of 98%, and natural graphite having an ash content of 0.01 weight % or lower was immersed and stirred in the acid treatment solution for 30 minutes to cause a reaction. Next, the resultant reaction product was removed from the acid treatment solution, thereafter washed with water sufficiently to bring the pH closer to 7, and further dried. Thereby, an acid-treated expanded graphite having a particle size of 30 to 100 mesh was prepared.

(Preparation of Nb-containing Sol Solution)

Along with the preparation of the acid treated graphite, a Nb-containing sol solution was prepared in the following manner.

First, niobium chloride ($NbCl_5$) and methyl alcohol ($CH_3OH$) were mixed together, so that the reaction represented by the following formula (1) was caused. Thereby, $Nb(COH_3)_5$ was obtained.

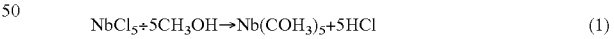

$$NbCl_5 + 5CH_3OH \rightarrow Nb(COH_3)_5 + 5HCl \qquad (1)$$

Next, $nNb(COH_3)_5$ was allowed to stand at room temperature for 24 hours, so that the hydrolysis reaction represented by the following formula (2) was caused. Thereby, a Nb-containing sol solution represented by the formula $[Nb(OH)_5]_n$ was obtained.

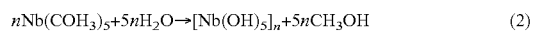

$$nNb(COH_3)_5 + 5nH_2O \rightarrow [Nb(OH)_5]_n + 5nCH_3OH \qquad (2)$$

(Preparation of Nb-containing Expanded Graphite Sheet)

The Nb-containing sol solution was added to the acid treated graphite [the preparation amount of Nb shown in the following formula (3) was set at 10000 ppm] and mixed together, and the mixture was air-dried. Next, the resultant mixture was heated in an electric furnace at 1000° C. for 30 seconds, to carry out an expansion process. The obtained expanded graphite was pressed and thereafter heat-treated at 500° C. in the atmosphere for 1 hour, whereby a Nb-containing expanded graphite sheet was obtained. This Nb-containing expanded graphite sheet had dimensions of 30 mm×30 mm, a thickness 0.5 mm, and a bulk density of 0.66 Mg/m³.

Preparation amounmt of Nb=Weight of Nb/Weight of Acid treated graphite    (3)

Here, during the above-described heat treatment in the atmosphere, the reaction represented by the following formula (4) was caused, and $Nb_2O_5$ was formed in the graphite sheet.

$$2[Nb(OH)_5]_n \rightarrow nNb_2O_5 + 5nH_2O \quad (4)$$

The amount of $Nb_2O_5$ in the prepared expanded graphite sheet was determined by EPMA (electron probe microanalyzer). As a result, it was found that the content of Nb was 740 ppm and the content of O was 270 ppm in weight ratio. Noted that the content of Nb and the content of O were determined from the intensity of Nb-Lα rays and the intensity of O-Kα rays of EMPA.

The air battery prepared in this manner is hereinafter referred to as Battery A.

Comparative Example

An air battery was prepared in the same manner as described in Example above, except that no Nb-containing sol solution was added to the acid treated graphite.

The air battery prepared in this manner is hereinafter referred to as Battery Z.

Experiment 1

The above-described Batteries A and Z were discharged at a constant current of 0.5 mA, to investigate the relationship between time and voltage. The results are shown in FIG. 2.

Figure 2:
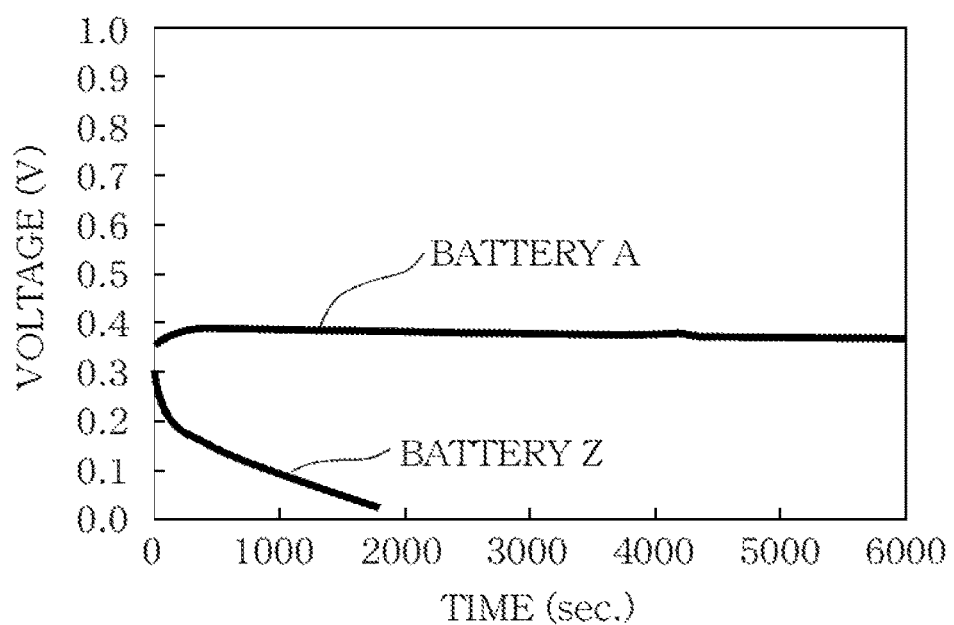
FIG. 2 is a graph illustrating the relationship between time and voltage for Batteries A and Z.

As clearly seen from FIG. 2, it was observed that in Battery A, which used the Nb-containing expanded graphite sheet, the voltage did not decrease even after 6000 hours. On the other hand, in Battery Z, which used an expanded graphite sheet that does not contain Nb, the voltage decreased from the initial stage of discharge, and the voltage reached approximately 0 V at about 2000 hours.

Experiment 2

Figure 3:
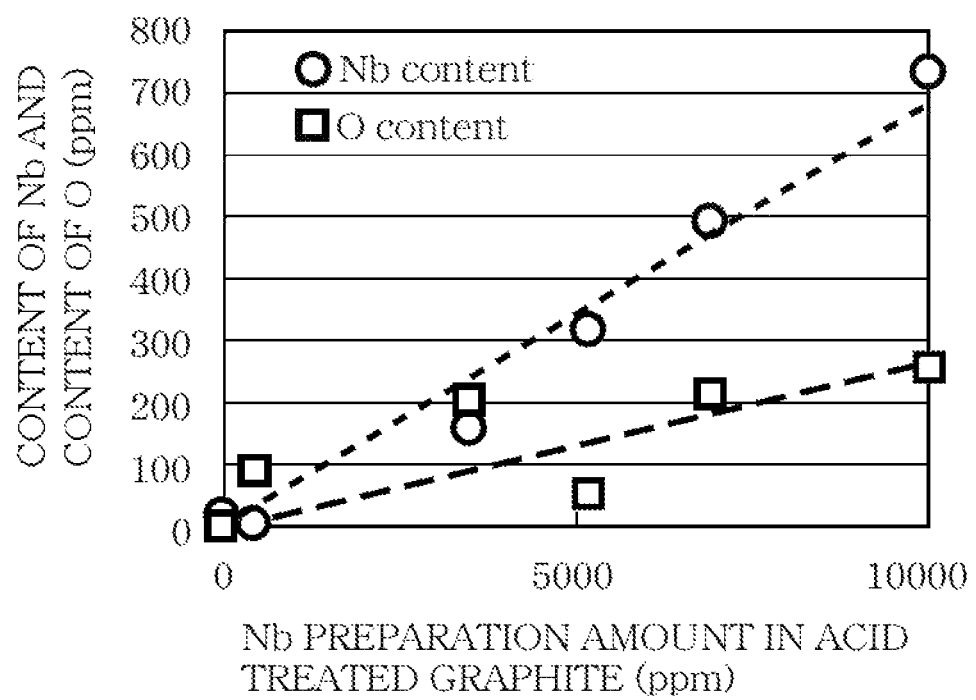
FIG. 3 is a graph illustrating the relationship between Nb preparation amount versus Nb content and O content in a graphite sheet.

The preparation amount of Nb was varied when adding the Nb-containing sol solution to the acid treated graphite, to investigate the content of Nb and the content of O in the graphite sheet. The results are shown in FIG. 3. Note that the preparation amount of Nb was set at 0 ppm, 500 ppm, 3000 ppm, 5000 ppm, 7000 ppm, and 10000 ppm.

As clearly seen from FIG. 3, when the preparation amount of Nb was greater, the content of Nb and the content of O in the graphite sheet were accordingly higher. From the results, it is believed that a niobium-based oxide semiconductor (Nb oxide) was allowed to be dispersed in the expanded graphite sheet.

(Other Embodiments)

(1) The graphite that is used as the raw material is not limited to natural graphite as described above, but may be pyrolytic graphite, kish graphite, and the like. However, it is preferable to use natural graphite flake, which is readily industrially available. In addition, it is desirable that the grain size of the graphite be from 30 mesh to 100 mesh.

(2) The sulfuric acid used in the acid treatment is not limited to the strong sulfuric acid, and it is sufficient as long as a sulfur component is contained, such as with sulfuric anhydride and fuming sulfuric acid. However, for industrial purposes, it is desirable to use a strong sulfuric acid with a concentration of 90% or higher, more preferably a concentration of from 95% to 98%. Moreover, the duration of the immersing and stirring of the graphite is not limited to 30 minutes, but it is desirable that the duration be from about 15 minutes to about 60 minutes.

(3) The oxidizing agent is not limited to hydrogen peroxide as described above, but may be ammonium peroxide, potassium peroxide, and the like. In addition, the amount thereof to be added may be from 1 to 10 parts by weight with respect to 100 parts by weight of the sulfuric acid.

(4) The method for neutralizing the acid treated graphite is not limited to sufficient washing with water. It may be carried out by using a solid neutralizer agent selected from oxides of alkaline-earth metals, hydroxides, carbonates, and the like.

(5) The present invention is not limited to the above-described aluminum air battery. It is also possible that the present invention may be applied to other batteries such as a zinc air battery, an iron air battery, a magnesium air battery, a sodium air battery, and a calcium air battery.

INDUSTRIAL APPLICABILITY

The present invention is applicable for use in, for example, batteries for hearing aid devices, batteries for electric vehicles, batteries for hybrid vehicles, and batteries for fuel cell vehicles.

The invention claimed:

1. A positive electrode for an air battery, comprising an expanded graphite sheet containing expanded graphite and Nb dispersed within the sheet; wherein the Nb is contained in a weight proportion of 5 ppm to 50,000 ppm with respect to the expanded graphite.

2. The positive electrode for an air battery according to claim 1, wherein the Nb is contained in the sheet in the form of a Nb oxide.

3. The positive electrode for an air battery according to claim 1, wherein the Nb is dispersed within the sheet with a Nb-containing sol solution.

4. The positive electrode for an air battery according to claim 1, wherein the expanded graphite sheet has a bulk density of from 0.2 Mg/m³ to 2.0 Mg/m³.

5. The positive electrode for an air battery according to claim 2, wherein the expanded graphite sheet has a bulk density of from 0.2 Mg/m³ to 2.0 Mg/m³.

6. The positive electrode for an air battery according to claim 3, wherein the expanded graphite sheet has a bulk density of from 0.2 Mg/m³ to 2.0 Mg/m³.

7. Tice positive electrode for an air battery according to claim 1, wherein the expanded graphite sheet has a thickness of from 0.10 mm to 3.0 mm.

8. The positive electrode for an air battery according to claim 2, wherein the expanded graphite sheet has a thickness of from 0.10 mm to 3.0 mm.

9. The positive electrode for an air battery according to claim 3, wherein the expanded graphite sheet has a thickness of from 0.10 mm to 3.0 mm.

10. An air battery comprising: a positive electrode, a negative electrode, and an electrolyte solution; wherein the positive electrode comprises an expanded graphite sheet containing expanded graphite and Nb dispersed within the sheet; and wherein the Nb is contained in a weight proportion of 5 ppm to 50,000 ppm with respect to the expanded graphite.

11. The air battery according to claim 10, wherein the Nb is dispersed within the sheet with a Nb-containing sol solution.

12. The air battery according to claim 10, wherein the expanded graphite sheet includes a surface that is shielded from ambient air and is opposite a surface thereof being in contact with the electrolyte solution.

13. The air battery according to claim 11, wherein the expanded graphite sheet includes a surface that is shielded from ambient air and is opposite a surface thereof being in contact with the electrolyte solution.

* * * * *